(12) United States Patent
Monti et al.

(10) Patent No.: US 7,546,942 B2
(45) Date of Patent: Jun. 16, 2009

(54) SYSTEM FOR ASSEMBLING, IN PARTICULAR BY WELDING, STRUCTURES MADE UP OF ELEMENTS OF PRESSED SHEET METAL, SUCH AS MOTOR-VEHICLE BODIES OR SUBASSEMBLIES THEREOF

(75) Inventors: Denny Monti, Collegno (IT); Piero Bossotto, Turin (IT)

(73) Assignee: COMAU S.p.A., Grugliasco (IT)

( * ) Notice: Subject to any disclaimer, the term of this patent is extended or adjusted under 35 U.S.C. 154(b) by 20 days.

(21) Appl. No.: 12/000,602

(22) Filed: Dec. 14, 2007

(65) Prior Publication Data

US 2008/0148546 A1 Jun. 26, 2008

(30) Foreign Application Priority Data

Dec. 22, 2006 (IT) .......................... TO2006A0917

(51) Int. Cl.
*B23K 37/04* (2006.01)
*B25B 27/14* (2006.01)

(52) U.S. Cl. .................. 228/43; 228/44.3; 228/49.1; 228/49.4; 29/281.1

(58) Field of Classification Search .................. None
See application file for complete search history.

(56) References Cited

U.S. PATENT DOCUMENTS

| | | | | |
|---|---|---|---|---|
| 5,902,496 | A * | 5/1999 | Alborante | 219/86.24 |
| 6,008,471 | A * | 12/1999 | Alborante | 219/158 |
| 6,070,781 | A * | 6/2000 | Johnson et al. | 228/49.4 |
| 6,138,889 | A * | 10/2000 | Campani et al. | 228/4.1 |
| 6,170,732 | B1 * | 1/2001 | Vogt et al. | 228/4.1 |
| 6,173,881 | B1 * | 1/2001 | Sloan et al. | 228/4.1 |
| 6,193,046 | B1 * | 2/2001 | Segawa et al. | 198/339.1 |
| 6,193,142 | B1 * | 2/2001 | Segawa et al. | 219/148 |
| 6,339,874 | B2 * | 1/2002 | Segawa et al. | 29/824 |
| 6,360,421 | B1 * | 3/2002 | Oatridge et al. | 29/469 |
| 6,378,186 | B1 * | 4/2002 | Angel | 29/281.1 |
| 6,389,698 | B1 * | 5/2002 | Malatier | 29/897.2 |
| 6,438,842 | B1 * | 8/2002 | Raami | 29/897.2 |
| 6,493,930 | B1 * | 12/2002 | Raami | 29/783 |
| 6,595,407 | B2 * | 7/2003 | McNamara et al. | 228/212 |
| 6,612,011 | B2 * | 9/2003 | Mayr et al. | 29/430 |
| 6,643,905 | B2 * | 11/2003 | Rhoads et al. | 29/407.09 |
| 6,675,467 | B2 * | 1/2004 | Oatridge et al. | 29/771 |
| 6,691,392 | B2 * | 2/2004 | Savoy et al. | 29/407.09 |
| 6,835,909 | B2 * | 12/2004 | Nakamura et al. | 219/86.7 |
| 6,851,166 | B1 * | 2/2005 | Demit et al. | 29/281.5 |

(Continued)

*Primary Examiner*—Kiley Stoner
(74) *Attorney, Agent, or Firm*—Nixon & Vanderhye P.C.

(57) ABSTRACT

A flexible system for welding motor-vehicle bodies or subassemblies thereof envisages a series of pairs of side frames provided with referencing and clamping devices for keeping in the correct position the structures to be assembled during welding. For each different type of body to be assembled a different pair of side frames is provided, equipped with referencing and clamping devices adapted to the respective type of body. Each pair of side frames is associated to a basic structure, with which it forms a unitary referencing and clamping module. Said modules can be moved through the assembly station to follow one another in the operative welding position, according to the type of body to be welded. The structure to be assembled, or at least part thereof, is fed to the welding station by means of a conveying line that is totally independent and separate from the basic structures of the modules.

13 Claims, 3 Drawing Sheets

U.S. PATENT DOCUMENTS

| | | | |
|---|---|---|---|
| 6,948,236 B2* | 9/2005 | Saito et al. | 29/783 |
| 7,143,494 B2* | 12/2006 | Savoy | 29/407.1 |
| 2002/0023334 A1* | 2/2002 | Rhoads et al. | 29/434 |
| 2002/0056189 A1* | 5/2002 | Oatridge et al. | 29/771 |
| 2002/0100155 A1* | 8/2002 | Nakamura | 29/407.1 |
| 2002/0170160 A1* | 11/2002 | Savoy et al. | 29/407.1 |
| 2003/0057256 A1* | 3/2003 | Nakamura et al. | 228/49.1 |
| 2003/0071111 A1* | 4/2003 | McNamara et al. | 228/212 |
| 2003/0115746 A1* | 6/2003 | Saito et al. | 29/783 |
| 2004/0158965 A1* | 8/2004 | Savoy | 29/407.1 |
| 2005/0035175 A1* | 2/2005 | Nakamura et al. | 228/44.3 |
| 2005/0103821 A1* | 5/2005 | Bossert et al. | 228/101 |
| 2005/0121291 A1* | 6/2005 | Nakamura et al. | 198/463.1 |
| 2007/0039155 A1* | 2/2007 | Savoy | 29/407.1 |
| 2007/0125832 A1* | 6/2007 | Rossinger | 228/101 |
| 2008/0000068 A1* | 1/2008 | Savoy et al. | 29/429 |
| 2008/0061110 A1* | 3/2008 | Monti et al. | 228/6.1 |
| 2008/0105733 A1* | 5/2008 | Monti et al. | 228/178 |

\* cited by examiner

SYSTEM FOR ASSEMBLING, IN PARTICULAR BY WELDING, STRUCTURES MADE UP OF ELEMENTS OF PRESSED SHEET METAL, SUCH AS MOTOR-VEHICLE BODIES OR SUBASSEMBLIES THEREOF

BACKGROUND OF THE INVENTION

The present invention relates to systems for assembling, in particular by welding, structures made up of elements of pressed sheet metal, such as motor-vehicle bodies or subassemblies thereof.

In particular, the invention regards an assembly system designed to operate automatically on a plurality of different types of structures to be assembled, for example, on bodies of different models, of the type comprising:
- a station for assembly, in particular by welding;
- conveying means for carrying at least part of the structures to be assembled to the assembly station and for carrying the assembled structures out of the assembly station; and
- a plurality of pairs of side frames provided with position-referencing and clamping means for positioning and clamping the structures to be assembled, the referencing and clamping means provided on the side frames of each pair being adapted to the configuration of a corresponding type of structure to be assembled, in which the pairs of side frames are movable on guide means for enabling replacement, according to the type of structure to be assembled, of the pair of side frames that are present in the assembly station, in which each pair of side frames is carried by a respective basic structure that is movable through the assembly station so as to form with the two frames a unitary movable referencing and clamping module, said side frames being mounted on the respective basic structure in such a way that they can be displaced transversely with respect to a longitudinal direction of said basic structure, between an open condition where the side frames are set at a greater distance apart, in which a structure to be assembled can be received between said frames or an assembled structure can come out of the space comprised between said frames, and a closed condition, in which the two frames are rigidly connected together and their referencing and clamping means can engage the structure to be assembled.

The known systems of the type referred to above present the drawback of having a relatively complex structure and of requiring operations that are relatively complicated and expensive in terms of time for replacement of the pair of side frames that are in the operative position inside the assembly station.

SUMMARY OF THE INVENTION

With a view to overcoming said drawback, the subject of the invention is an assembly system having all the characteristics that have been referred to above and characterized moreover in that the aforesaid conveying means used for carrying at least part of the structures to be assembled to the assembly station and for carrying the assembled structures out of the assembly station are totally independent and separate from the basic structures of the aforesaid referencing and clamping modules.

Thanks to said characteristic, it is possible to obtain an extreme simplification of the system with respect to the known solutions illustrated in the documents, in which part of the line for conveying bodies is defined above the basic structures of the referencing and clamping modules. Instead, in the system according to the invention, the replacement of the referencing and clamping module that is in the assembly station can be performed independently and without any interference, and hence, if so desired, even simultaneously, with respect to the movement for conveying a new structure to be assembled into the assembly station and for conveying an assembled structure out of the assembly station. Typically, the assembly station is provided with one or more welding robots programmable for carrying out automatic welding of the structure prearranged in the assembly station after this has been referenced in position and clamped by means of a referencing and clamping module. In theory, the invention is in any case applicable both to different welding techniques (for example, electrical spot welding and laser welding) and also to different assembly techniques (for example, also by clinching).

In the preferred embodiment, the aforesaid means for conveying the structures to be assembled and the assembled structures comprise an overhead conveying line, comprising in particular at least one overhead rail and a plurality of supporting members for supporting the structures to be conveyed, said members being mounted movable along said overhead rail.

According to a further preferred characteristic, said conveying line traverses the assembly station in a longitudinal direction, and said system moreover comprises a second conveying line directed in said longitudinal direction, for conveying the referencing and clamping modules at input to or at output from an operative position in the assembly station.

According to a further preferred characteristic, said second conveying line has two separate end sections that are movable transversely with respect to said longitudinal direction, by means of transverse conveying lines, between a position of alignment with said longitudinal direction and a position set at a lateral distance from said longitudinal direction.

Preferably, moreover, the system comprises a by-pass line parallel to the aforesaid longitudinal direction, along which the referencing and clamping modules can be displaced to move from one to the other of the aforesaid positions set at a lateral distance apart.

Thanks to the aforesaid characteristics, a referencing and clamping module can be carried rapidly from the operative position in the assembly station to a waiting position, upstream or downstream of the assembly station, at the end of the operation of assembly. Simultaneously, another module associated to a structure to be assembled can be brought from a waiting position to the operative position in the assembly station.

Furthermore, via the by-pass line, a module that is in the waiting position upstream or downstream of the assembly station can be brought rapidly into the other waiting position, respectively downstream or upstream of the station, without passing through the operative position.

In addition, at least one of said transverse conveying lines communicates with a magazine containing referencing and clamping modules corresponding to different types of structure to be assembled. In this way, the system can be adapted to operate on a number, which may even be high, of different types of structure to be assembled.

In the case of a system designed for assembling motor-vehicle bodies, it can be envisaged that the line for conveying the bodies feeds bodies that have undergone preliminary provisional assembly, or else only the floor panels of the bodies, in which case manipulator means are provided for preparing the side panels of the bodies on said side frames, when they are in an open condition.

BRIEF DESCRIPTION OF THE DRAWINGS

Further characteristics and advantages of the invention will emerge from the ensuing description, with reference to the annexed plates of drawings, which are provided purely by way of non-limiting example and in which.

DETAILED DESCRIPTION OF THE INVENTION

Figure 3:
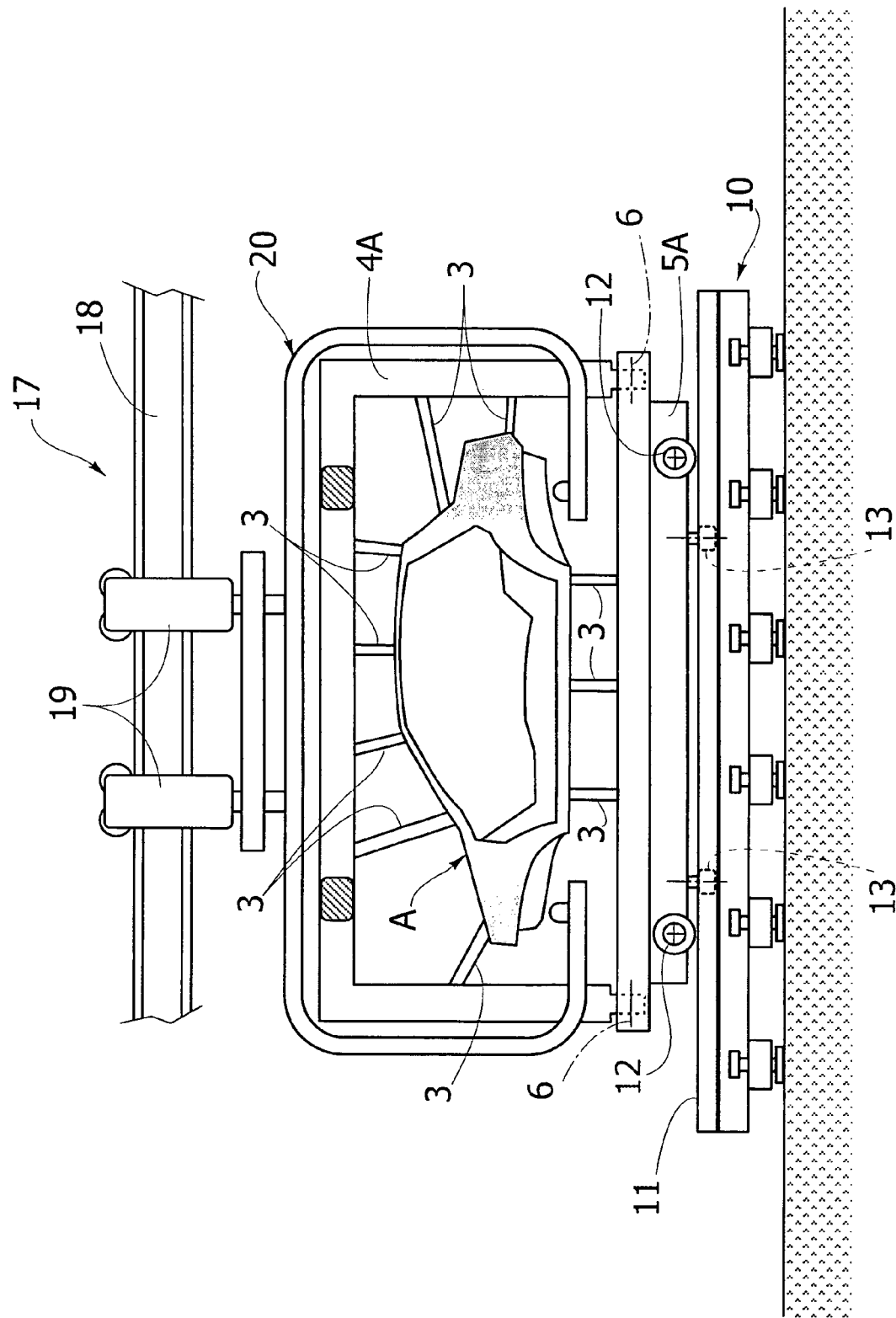
FIG. 3 is a side view of the assembly station of FIG. 2.

With reference to the drawings, the reference number 1 designates as a whole an assembly station for assembling, by welding, structures made of pressed sheet metal, in particular motor-vehicle bodies or subassemblies thereof. In the typical case, the station 1 is a framing station, designed for making a sufficient number of welds to bestow a stable geometry upon the body. Provided in a position corresponding to the assembly station 1 are welding robots 2, of any known type, programmed for making a predetermined number of electrical-welding spots on the body that is in the assembly station 1. During execution of the welding operations, the parts of the body are referenced in a precise position, clamped together by means of a plurality of referencing and clamping devices, in themselves of a known type, which are designated as a whole by the reference number 3 in FIG. 3. The system illustrated is designed to operate on different types of motor-vehicle body, for example on different models of body or on different versions of one and the same model of body (for example, a station wagon and a saloon car). The referencing and clamping devices 3 designed to operate on different types of body are at least in part different from one another. Consequently, according to a technique that is by now traditional, the system envisages a number of pairs of clamping frames 4A, 4B, 4C, D, 4E, etc., designed to operate on corresponding models A, B, C, D, E, etc. of bodies and hence provided with referencing and clamping devices 3 adapted thereto.

Each pair of clamping frames 4A-4E is carried by a respective basic structure 5A-5E, which is also provided with referencing and clamping devices 3, at least part of which can be raised, for a purpose that will emerge clearly in what follows. Consequently, each pair of frames 4 with the corresponding basic structure 5 form a unitary referencing and clamping module, designated as a whole by 8A, 8B, 8C, 8D, 8E, etc.

Figure 1:
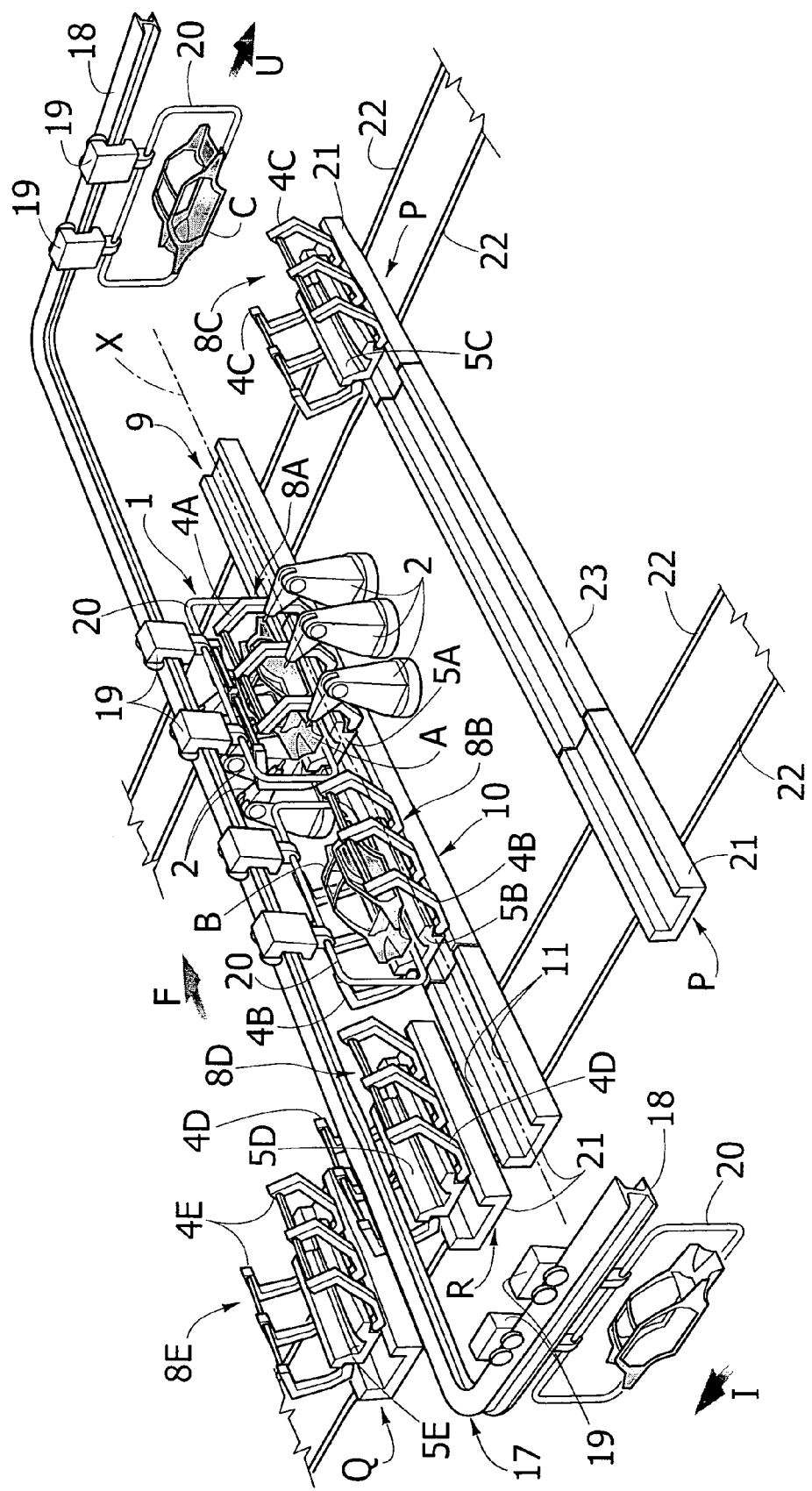
FIG. 1 is a schematic perspective view of a preferred embodiment of the assembly system according to the invention.
Figure 2:
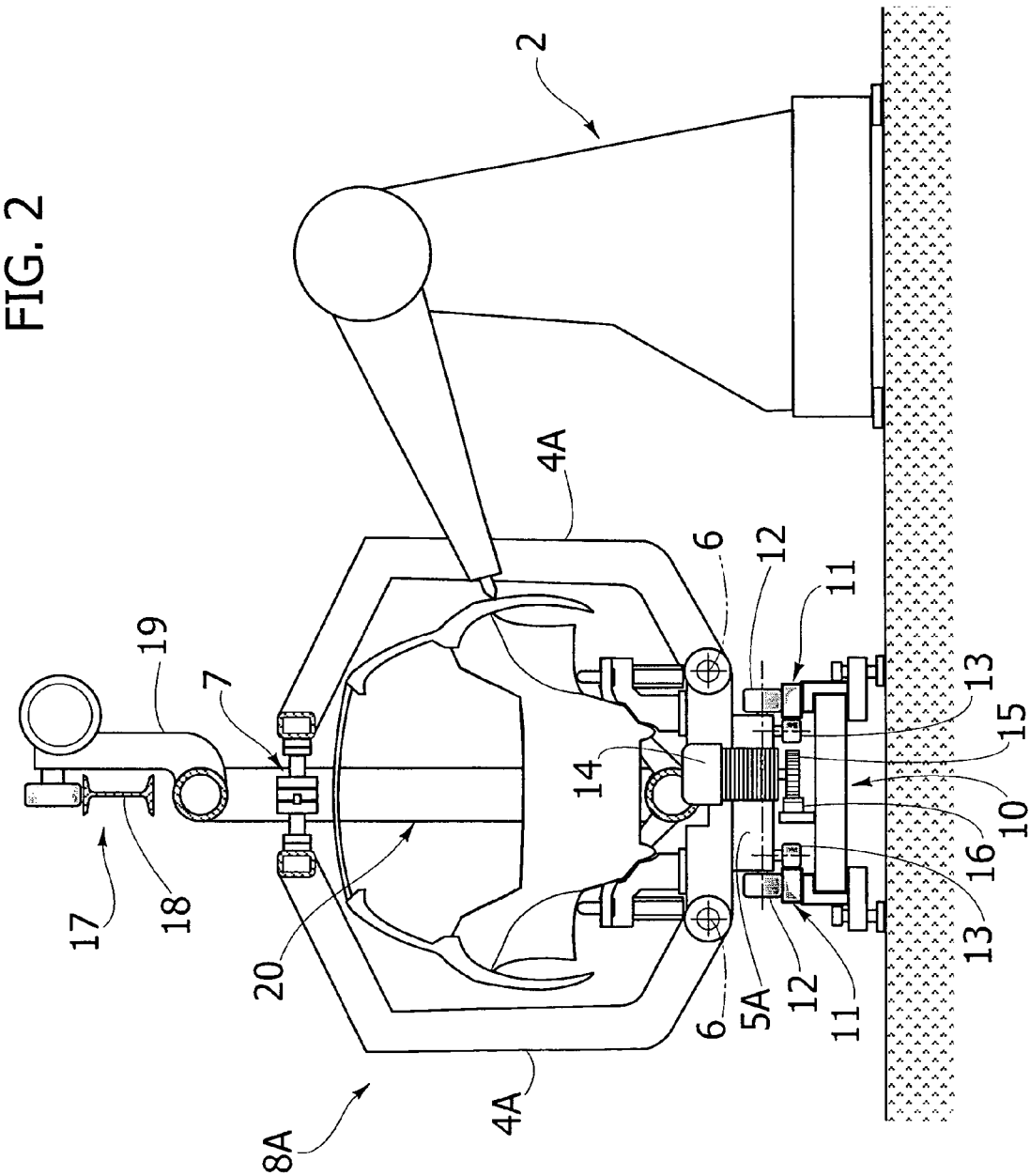
FIG. 2 is a schematic front view of the assembly station forming part of the system of FIG. 1.

As may be seen in FIG. 2, the two frames 4 of each pair, in the specific case illustrated, the frames 4A, are mounted articulated to the basic structure 5, in the specific case illustrated 5A, about two longitudinal axes 6 so as to enable their displacement between an open position, in which their top ends are set at a distance from one another (see the frames 4B, 4C, 4D, 4E in FIG. 1), and a closed position (visible in FIG. 2), in which the top ends of the side frames are joined together by means of one or more connection devices 7 of any known type.

In the present description, the means designed to control the movement of the side frames between their open position and their closed position are not illustrated, since they can be made in any known way. The elimination of said details from the drawings moreover renders the latter more readily and easily understandable. In a possible embodiment, said movement is controlled via a system of levers by an electric motor mounted on the basic structure that carries the side frames.

The basic structure 5 of each module 8 is movable in a longitudinal direction X through the assembly station 1 on a conveying line 9. In the example illustrated, the line 9 comprises a guide structure 10 on the floor (which in FIG. 1 is illustrated only schematically, for reasons of simplicity), defining a pair of tracks or rails 11. With reference to FIG. 2, mounted so that they can turn freely on the bottom part of the basic structure 5 are wheels 12 with horizontal axis, which engage on the rails 11, and wheels 13 with vertical axis, which engage on the inner sides of the rails 11. In FIG. 1 said wheels have not been illustrated, for simplicity of representation. Once again in the case of the example illustrated, each basic structure 5 is provided with an electric motor 14 designed to actuate a pinion with vertical axis 15, which rolls, meshing therewith, along a stationary toothing or rack 16 carried by the floor structure 10.

Preferably, each module 8 is provided on board with an electrical battery (not illustrated), for supplying the motor 14.

Of course, the line 9 for conveying the modules 8 can be made in any other way in itself known. In any case, said conveying line is prearranged for enabling the movement of any module 8, in the longitudinal direction X, between an operative position in the station 1, and a waiting position, upstream or downstream of the station 1 (with reference to a direction of advance indicated by the arrow F in FIG. 1). Said movement enables provision at any moment in the operative position in the assembly station 1 of the referencing and clamping module 8 corresponding to the type of body to be welded.

Conveying the bodies to be welded into the assembly station and conveying the welded bodies out of the assembly station is obtained, in the example illustrated, by means of an overhead conveying line 17, comprising an overhead rail 18, mounted movable on which, in a way in itself known, are carriages 19 associated two by two to respective supporting members 20, hooked to which is a respective body of any type A, B, C, D, E, on which the system is designed to operate.

One example of embodiment envisages that the overhead conveying line 17 feeds in the direction indicated by the arrow F in FIG. 1, starting from an input I up to an output U, bodies already preassembled by means of provisional joining of a floor panel to two side panels and one or more top cross members. In this case, the bodies are formed in a station upstream (not illustrated), by means of provisional connection of the parts that make it up, for example by means of clinching. An alternative embodiment envisages that the overhead conveying line 17 feeds to the assembly station 1 only the floor panel of the bodies, whilst the side panels of each body are equipped, directly on the side frames 4, with the respective module 8, when they are in a waiting position, preferably with the aid of manipulator robots.

Operation of the system presented above is described in what follows.

In the condition illustrated by way of example in FIG. 1, present in the operative position in the assembly station 1 is a body of type A, referenced and clamped by means of the corresponding module 8A. In said condition, the welding robots 2 can operate by making the necessary welding spots. In the meantime, present in the waiting position upstream of the assembly station, with reference to the direction F, is the module 8B, with the side frames 4B in the open condition. The overhead conveying line 17 has carried a complete body of type A into the module 8. Alternatively, the line 17 carries just the floor panel of type A, whilst manipulator robots (not illustrated) equip the frames 4B with two side panels of type A. In either case, the frames 4B are closed for engaging the referencing and clamping devices 3 on the body A thus formed. Said movement occurs practically simultaneously with a raising of the devices 3 carried by the basic structure 5B, which can be lifted in such a way that the body is raised with respect to its rests on the supporting member 20 and is referenced in position by the module 8B.

An important advantage of the present invention lies in the fact that, with reference to the condition described above, the body B can be referenced and clamped in position by the respective module 8B when it is still in the waiting position close to the operative position in the welding station.

When welding of the body A that is in the assembly station 1 is completed, the side frames 4A are opened, disengaging the clamping devices 3, whilst the devices 3 for supporting the body carried by the basic structure 5A will be lowered to re-consign the assembled body to the supporting member 20. The overhead line 17 can then carry the welded body out of the station towards the output indicated by the arrow U in FIG. 1. If the next body to be welded were once again of type A, the module 8A would remain in the working position, awaiting the new body. In the case, instead, illustrated in the figure, where the next body to be assembled is of type B, whilst the body previously welded is carried out of the station by the overhead line 17, the module 8B, already previously engaged on a body of type B, is brought into the operative position within the welding station by means of movement above on the line 9, whilst the module 8A moves into the waiting position downstream (with reference to the arrow F) of the station. In said condition, since the module 8B is already closed above the body B, the welding robots 2 can enter immediately into action. In other words, with the system according to the invention there are avoided the dead times that are usually required at the moment when a new structure to be assembled enters the assembly station, for the purpose of engaging thereon the side frames provided with the referencing and clamping devices.

As may moreover be seen, in the system according to the invention, provided for conveying the bodies is a line that is completely independent and separate with respect to the basic structures of the clamping modules. In other words, in the system according to the invention, contrary to the known solutions referred to above, part of the line for conveying the bodies on the basic structure 5 of the modules 8 is not defined so that the movement of the referencing and clamping modules 8 and the movement of the bodies can be performed, if so desired, even simultaneously and in any case without any interference between them.

In order to increase the flexibility and efficiency of the system, enabling any module 8 to be carried rapidly from the waiting position upstream of the welding station to the waiting position downstream of the welding station, or vice versa, without passing through the station, i.e., passing behind the welding robots, at its ends the floor guide structure 10 of the line 9 comprises separate end portions 21, each of which can be displaced transversely with respect to the longitudinal direction X on the rails 22 of a transverse conveying line, between a position aligned in the direction X and a position P set at a lateral distance therefrom. Furthermore, the system comprises a by-pass line 23, formed by a floor guide structure similar to the structure 10 of the line 9, which runs parallel to the direction X to enable movement of the modules 8 between the two positions P. In this way, any module 8 that is on one of the end portions 21 of the line 9 can be translated transversely up to a position P, run along the structure 23 up to the other position P, and then move again transversely so as to be brought back onto the line 9, but at the other end thereof with respect to the starting position.

The transverse lines formed by the rails 22 can moreover have waiting stations Q, R for as many modules 8 designed for different types of body. Furthermore, said transverse lines can communicate with a magazine containing referencing and clamping modules corresponding to other types of body, a fact that enables a considerable increase in the number of models of body on which the system can operate.

Of course, without prejudice to the principle of the invention, the details of construction and the embodiments may vary widely with respect to what is described and illustrated herein purely by way of example, without thereby departing from the scope of the present invention.

What is claimed is:

1. A system for assembling, in particular by welding, structures made of elements of pressed sheet metal, designed to operate automatically on a plurality of different types of structures to be assembled, comprising:
    an assembly station;
    conveying means for carrying at least part of the structures to be assembled to the assembly station and for carrying the assembled structures out of the assembly station;
    a plurality of pairs of side frames provided with position-referencing and clamping means for referencing and clamping the structures to be assembled, the referencing and clamping means provided on the side frames of each pair being adapted to the configuration of a corresponding type of structure to be assembled,
    in which the pairs of side frames are movable on guide means for enabling replacement, according to the type of structure to be assembled, of the pair of side frames that is present in the assembly station,
    in which each pair of side frames is carried by a respective basic structure that is movable through the assembly station so as to form with the two frames a unitary movable referencing and clamping module, said frames being mounted on the respective basic structure in such a way that they can be displaced transversely with respect to a longitudinal direction of said basic structure, between an open condition where said frames are set at a greater distance apart, in which a structure to be assembled can be received between said frames or an assembled structure can come out of the space comprised between said frames, and a closed condition, in which the two frames are connected rigidly together and their referencing and clamping means can engage the structure to be assembled,
    said system being characterized in that the aforesaid conveying means are totally independent and separate from the basic structures of the aforesaid referencing and clamping modules.

2. The system according to claim 1, wherein said conveying means comprise an overhead conveying line, comprising at least one overhead rail and a plurality of supporting members for supporting the structures to be conveyed that are mounted movable along said overhead rail.

3. The system according to claim 2, wherein said conveying line traverses the assembly station in a longitudinal direction and in that said system moreover comprises a second conveying line directed in said longitudinal direction, for conveying the referencing and clamping modules at input to or at output from an operative position in the assembly station.

4. The system according to claim 3, wherein said second conveying line has two separate end sections that are movable transversely with respect to said longitudinal direction, by means of transverse conveying lines, between a position of alignment with said longitudinal direction and a position set at a lateral distance from said longitudinal direction.

5. The system according to claim 4, wherein it comprises a by-pass line parallel to the aforesaid longitudinal direction, along which the referencing and clamping modules can be displaced to move from one to the other of the aforesaid positions set at a lateral distance apart.

6. The system according to claim 4, wherein at least one of said transverse conveying lines communicates with a magazine containing referencing and clamping modules corresponding to different types of structure to be assembled.

7. The system according to claim 1, for assembling motor-vehicle bodies, wherein said line for conveying bodies is prearranged for feeding bodies that have undergone preliminary provisional assembly.

8. The system according to claim 1, for welding motor-vehicle bodies, wherein said line for conveying bodies is prearranged for feeding the floor panels of the bodies, and in that manipulator means are provided for preparing the side panels of the bodies on said side frames, when the latter are in an open condition.

9. The system according to claim 1, wherein said assembly station is provided with one or more welding robots.

10. The system according to claim 3, wherein each of said basic structures of the referencing and clamping modules is provided with bottom wheels guided along said second conveying line.

11. The system according to claim 10, wherein each of the aforesaid basic structures is provided with an electric motor for governing a pinion designed to roll engaging along a stationary rack toothing prearranged along said second conveying line.

12. The system according to claim 1, wherein the movement of the two side frames associated to each of said basic structures between the aforesaid open position and the aforesaid closed position is controlled via a system of levers by an electric motor mounted on the basic structure.

13. The system according to claim 1, wherein in their closed condition the two side frames carried by each basic structure are connected with one another by means of one or more connection devices.

* * * * *